(12) United States Patent
Takaishi

(10) Patent No.: US 8,922,321 B2
(45) Date of Patent: Dec. 30, 2014

(54) METHOD AND APPARATUS FOR TRANSMITTING POWER AND DATA WITHOUT CONTACT

(75) Inventor: Konomu Takaishi, Osaka (JP)

(73) Assignees: Aska Electron Co., Ltd., Osaka-Shi (JP); Fujikura Co., Ltd., Tokyo (JP); Yonezawa Electric Wire Co., Ltd., Yonezawa-Shi (JP)

( * ) Notice: Subject to any disclaimer, the term of this patent is extended or adjusted under 35 U.S.C. 154(b) by 163 days.

(21) Appl. No.: 13/382,215

(22) PCT Filed: Jun. 28, 2010

(86) PCT No.: PCT/JP2010/060969
§ 371 (c)(1),
(2), (4) Date: Jan. 4, 2012

(87) PCT Pub. No.: WO2011/007662
PCT Pub. Date: Jan. 20, 2011

(65) Prior Publication Data
US 2012/0098634 A1   Apr. 26, 2012

(30) Foreign Application Priority Data

Jul. 17, 2009   (JP) .................................. 2009-168386

(51) Int. Cl.
| | | |
|---|---|---|
| H01F 5/00 | (2006.01) |
| H01F 27/28 | (2006.01) |
| H02J 7/02 | (2006.01) |
| H01F 27/36 | (2006.01) |
| H01F 38/14 | (2006.01) |
| H04B 5/00 | (2006.01) |

(52) U.S. Cl.
CPC ............... *H02J 7/025* (2013.01); *H01F 27/36* (2013.01); *H01F 38/14* (2013.01); *H04B 5/0031* (2013.01); *H04B 5/0037* (2013.01); *H04B 5/0081* (2013.01)

USPC .......................................... 336/200; 336/232

(58) Field of Classification Search
USPC .................................................... 336/200, 232
See application file for complete search history.

(56) References Cited

U.S. PATENT DOCUMENTS

| | | | |
|---|---|---|---|
| 6,265,789 B1 * | 7/2001 | Honda et al. .................... 307/33 |
| 2004/0044382 A1 * | 3/2004 | Ibrahim .......................... 607/60 |
| 2007/0182367 A1 * | 8/2007 | Partovi .......................... 320/108 |
| 2008/0061733 A1 * | 3/2008 | Toya ............................. 320/103 |
| 2009/0153283 A1 * | 6/2009 | Fouquet et al. ............... 336/200 |

\* cited by examiner

FOREIGN PATENT DOCUMENTS

| | | |
|---|---|---|
| JP | 6-096300 | 12/1994 |
| JP | 2008-048482 | 2/2008 |
| JP | 2008-301554 | 12/2008 |
| JP | 2008301554 A * | 12/2008 |

*Primary Examiner* — Tsz Chan
(74) *Attorney, Agent, or Firm* — Rankin, Hill & Clark LLP

(57) ABSTRACT

In a power and data transmission method which can transmit power and information (data) simultaneously and contactlessly, and an apparatus therefor, a pair of coil units are magnetically coupled to each other. Each of the coil units has: a power transmission coil configured by a coil which is wound in a plane, and a magnetic shield member which is placed on a rear surface of the coil; and an information transmission coil configured by a coil which is wound in a plane, and a magnetic shield member which is placed on a rear surface of the coil, the coil diameter of the information transmission coil is made different from that of the power transmission coil, and the information transmission coil and the power transmission coil are stacked. Data are transmitted while power is transmitted.

2 Claims, 4 Drawing Sheets

METHOD AND APPARATUS FOR TRANSMITTING POWER AND DATA WITHOUT CONTACT

TECHNICAL FIELD

The present invention relates to a method of contactlessly transmitting power and data, and an apparatus therefor, and more particularly to a contactless power and data transmission apparatus using a planar coil in which a coil is planarly wound.

BACKGROUND ART

Although recently a wireless transmission such as UWB (ultrawideband wireless) has been advanced, it is impossible in principle to perform a wireless power transmission. Therefore, an apparatus of the type in which power and information are simultaneously transmitted in a non-contact manner is hardly produced.

On the other hand, a contactless power transmission system (Patent Literature 1) in which a power transmission is performed in a non-contact (contactless) manner, and a data transfer circuit (Patent Literature 2) in which a data transmission is performed in a non-contact (contactless) manner have been proposed.

In these conventional contactless power transmission system and data transfer circuit, a pair of coils are opposingly placed, and power is supplied to or data is transmitted to or received from a secondary apparatus by means of electromagnetic induction between the pair of coils.

PRIOR ART LITERATURE

Patent Literature

Patent Literature 1: Japanese Patent Application Laid-Open No. 2006-230032
Patent Literature 2: Japanese Patent Application Laid-Open No. 2006-157230

SUMMARY OF THE INVENTION

Problem to be Solved by the Invention

In a system such as that of Patent Literature 1, usually, a power transmission coil (51) has a structure where a shield is placed outside a power transmission/reception coil, and, as shown in FIG. 4A, magnetic fluxes (M) at that time are generated in parallel to the surface of the coil without leaking to the outside of the shield.

Then, with respect to the positional relationship between an information transmission coil (52) and the power transmission coil (51), they may be contemplated to be placed on concentric circles as shown in FIG. 4B. In such a placement, the density of magnetic fluxes generated by the power transmission coil (51) is high, and also the information transmission coil (52) is in a positional relationship in which the coil receives the generated magnetic fluxes (M) in an optimum direction as shown in FIG. 4C. Therefore, a large electromotive force (F) is generated, and has a large influence on transmission/reception signals for information transmission which is the original purpose, so that a sufficient S/N ratio cannot be obtained. Consequently, the system is not adequate for information transmission. In the positional relationship, moreover, a signal of the information transmission coil, i.e., the magnetic fluxes (M) are converted to an electromotive force of the power transmission coil (51), and most of the energy is absorbed to increase the loss, so that the system is impractical.

As described above, in each of conventional noncontact power transmission system and data transfer circuit, power or information can be individually conveyed by means of electromagnetic induction produced between the pair of coils, but information and power cannot be simultaneously conveyed, and there is no technical concept that information and power are simultaneously conveyed.

In view of forgoing, it is an object of the invention to provide a power and data transmission apparatus which can convey power and information (data) simultaneously and contactlessly.

Means for Solving the Problem

In order to attain the object, the invention is characterized in that a pair of coil units are magnetically coupled to each other, each of the coil units having: a power transmission coil configured by a coil which is wound in a plane, and a magnetic shield member which is placed on a rear surface of the coil; and an information transmission coil configured by a coil which is wound in a plane, and a magnetic shield member which is placed on a rear surface of the coil, the information transmission coil and the power transmission coil being stacked in a state where the information transmission coil is positioned in a coil outer circumferential portion of the power transmission coil, and data are transmitted while power is transmitted.

Effects Of The Invention

According to the invention, the coil diameter of the information transmission coil is formed to be smaller than that of the power transmission coil, and magnetic fields are superimposed by stackingly placing the information transmission coil while being positioned in the coil outer circumferential portion of the power transmission coil. Although the direction of the magnetic fluxes of the power transmission coil pass through the information transmission coil, therefore, the positional relationship in which an electrical offset is performed is obtained, and hence substantially little electromotive force is generated. Moreover, also the magnetic fluxes generated by the information transmission coil are in a direction along which the fluxes are hardly absorbed by the power transmission coil, and hence the loss can be reduced. As a result of the above, information can be conveyed by a small power without impairing a signal for information transmission. Consequently, high-speed data transmission can be performed without impairing the efficiency of power transmission, and also without impairing the throughput and quality of information conveyance.

BEST MODE FOR CARRYING OUT THE INVENTION

Figure 1:
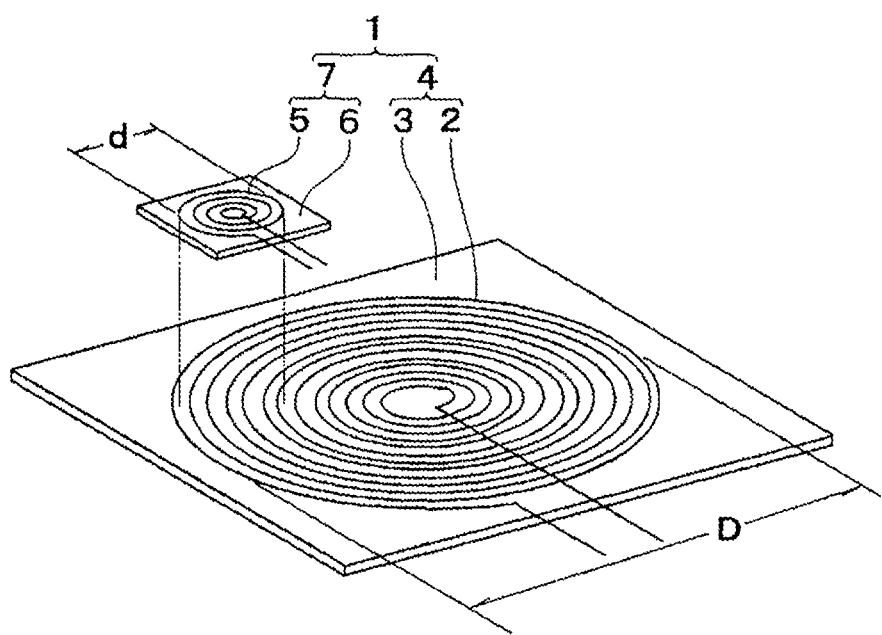
FIG. 1 is an exploded perspective view showing an embodiment of a coil unit.

The coil unit (1) is configured by stackingly placing an information transmission coil (7) in which a rectangular magnetic shield member (6) is placed on the rear surface side of a coil (5) that is planarly wound, on an upper surface portion of a power transmission coil (4) in which a rectangular magnetic shield member (3) is placed on the rear surface side of a coil (2) that is planarly wound.

The coil diameter (d) of the information transmission coil (7) is formed to be smaller than the coil diameter (D) of the power transmission coil (4), and the information transmission coil (7) is placed in a portion which is close to the outer circumference of the power transmission coil (4).

A pair of coil units (1) which are configured as described above are opposingly placed, one of the coil units is set as a primary coil (power-transmission side coil), the other coil unit is set as a secondary coil (power-reception side coil), and electromagnetic induction is produced between the coils, whereby power and information supplied to the primary coil are transmitted to the secondary coil.

The power transmission coil (4) and the information transmission coil (7) may be configured by forming a printed wiring on a laminated circuit board, by spirally winding a single-core lead wire, or by spirally winding a Litz wire.

Figure 2:
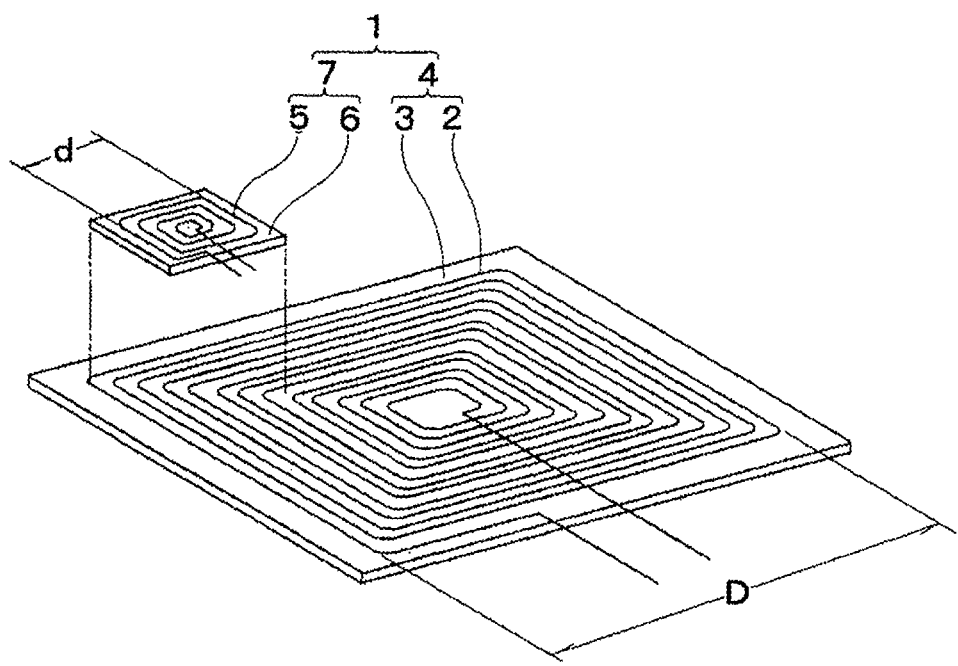
FIG. 2 is an exploded perspective view showing a different embodiment of the coil unit.
Figure 3:
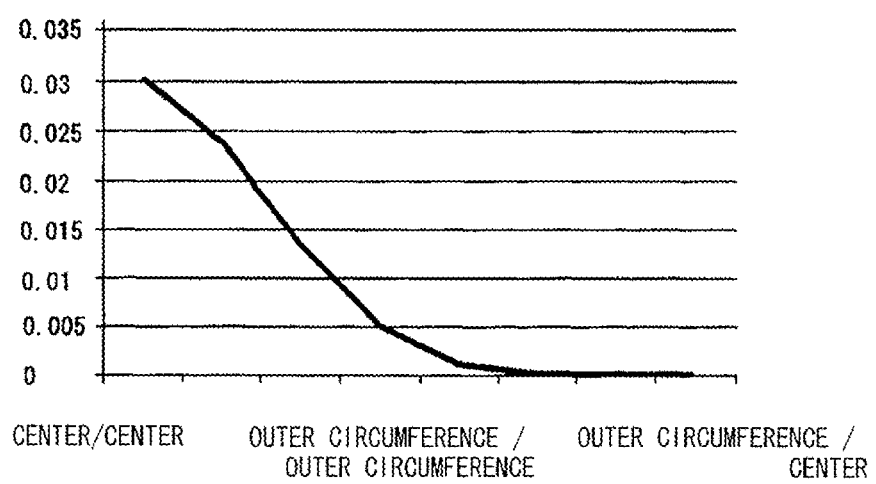
FIG. 3 is a graph showing an electromotive force of an information transmission coil according to the placement of a power transmission coil and the information transmission coil.

An embodiment shown in FIG. 2 has the same configuration as the above-described embodiment except that the coils (2), (5) for the power transmission coil (4) and information transmission coil (7) constituting the coil unit (1) are planarly wound so as to be formed into a substantially rectangular shape.

In a contactless power and data transmission apparatus in which a pair of coil units (1) that are configured as described above are opposingly placed, when a circuit configuration where the power transmission coil (4) resonates at 135 kHz and the information transmission coil (7) resonates at 24 MHz was employed, the respective transmissions were able to be realized without impeding respective features. In this case, the power transmission was 2.5 W, and the information transmission rate was 24 Mbps.

Figure 4A:
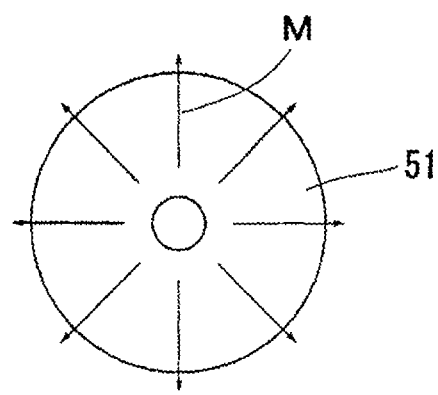
FIG. 4 is a view showing the directions of magnetic fluxes in the power transmission coil and the information transmission coil.
Figure 4B:
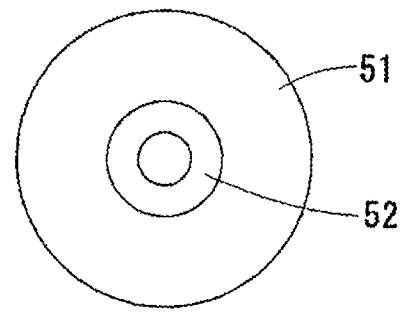
Figure 4C:
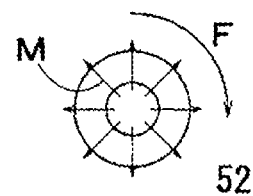

The electromotive force generated in the information transmission coil (7) was measured in a case where a circular coil having a diameter of 45 mm was used as the power transmission coil (4), a circular coil having a diameter of 15 mm was used as the information transmission coil (7), and the power transmission coil (51) and information transmission coil (52) shown in FIG. 4B were placed on concentric circles, and also in a case where the information transmission coil (7) was placed in an outer circumferential portion of the power transmission coil (4) shown in FIG. 1. The electromotive force which was generated in the case where the power transmission coils (4), (51) and the information transmission coils (7), (52) were placed on concentric circles was 30 mV. By contrast, the electromotive force in the case where the information transmission coils (7), (52) were placed in outer circumferential portions of the power transmission coils (4), (51) was 1 mV. Furthermore, when the centers of the information transmission coils (7), (52) are placed in outer circumferential portions of the power transmission coils (4), (51), the electromotive force is reduced to 0.001 mV.

From the above, it is seen that the positions of the information transmission coils (7), (52) are preferably those where magnetic fluxes in the opposite direction do not pass, and, as the outer circumferential edges of the information transmission coils are remoter from the centers of the power transmission coils (4), (51), the information transmission coils are less susceptible to the magnetic fluxes. Considering a projection plane, from the viewpoint of the component area, a practical position is considered to be preferably at a position where the outer circumferential edges of the both coils overlap with each other. Then, the electromotive force is sufficiently suppressed at a position where the outer circumferential edges of the both coils overlap with each other, and the position is a position suitable for information conveyance.

The above embodiments have been described with respect to the configuration where the magnetic shield members are formed into a square shape. The shield members may have an oblong rectangular shape according to the shape of the apparatus functioning as the secondary. In this case, also the shape of each coil may be an oblong rectangular shape or an oblong circular shape. The coil shape may be that according to the shape of the magnetic shield member, and, for example, rhombic, polygonal, circular, or oval.

DESCRIPTION OF REFERENCE NUMERALS

1 . . . coil unit, 2 . . . coil for power transmission coil, 3 . . . magnetic shield member for power transmission coil, 4 . . . power transmission coil, 5 . . . coil for information transmission coil, 6 . . . magnetic shield member for information transmission coil, 7 . . . information transmission coil.

The invention claimed is:

1. A power and data transmission method wherein a pair of coil units (1) are magnetically coupled to each other, each of said coil units having: a power transmission coil (4) configured by a coil (2) which is wound in a plane, and a magnetic shield member (3) which is placed on a rear surface of said coil (2); and an information transmission coil (7) configured by a coil (5) which is wound in a plane, and a magnetic shield member (6) which is placed on a rear surface of said coil (5), a coil diameter of said information transmission coil (7) being formed to be smaller than a coil diameter of said power transmission coil (4), said information transmission coil (7) being stackingly placed in a state where said information transmission coil is positioned in a coil outer circumferential portion of said power transmission coil (4), and data are transmitted while power is transmitted.

2. A power and data transmission apparatus wherein a pair of coil units (1) are magnetically coupled to each other, each of said coil units having: a power transmission coil (4) configured by a coil (2) which is wound in a plane, and a magnetic shield member (3) which is placed on a rear surface of said coil (2); and an information transmission coil (7) configured by a coil (5) which is wound in a plane, and a magnetic shield member (6) which is placed on a rear surface of said coil (5), a coil diameter of said information transmission coil (7) being formed to be smaller than a coil diameter of said power transmission coil (4), said information transmission coil (7) being stackingly disposed in a state where said information transmission coil is positioned in a coil outer circumferential portion of said power transmission coil (4), and data are transmitted while power is transmitted.

* * * * *